US006551960B1

(12) United States Patent
Laine et al.

(10) Patent No.: US 6,551,960 B1
(45) Date of Patent: Apr. 22, 2003

(54) PREPARATION OF SUPPORTED NANO-SIZED CATALYST PARTICLES VIA A POLYOL PROCESS

(75) Inventors: Richard M. Laine, Ann Arbor, MI (US); Alan Sellinger, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/596,764

(22) Filed: Jun. 19, 2000

(51) Int. Cl.[7] .......................... B01J 23/40; B01J 23/42; B01J 23/60; B01J 23/58; B01J 23/72
(52) U.S. Cl. ........................ 502/327; 502/329; 502/330; 502/331; 502/332; 502/334; 502/339
(58) Field of Search .................. 502/104, 327, 502/334, 339, 330, 331, 333, 335, 336, 337, 338, 325, 332

(56) References Cited

U.S. PATENT DOCUMENTS

| 4,294,608 | A | * | 10/1981 | Sedlak et al. | ............... | 75/0.5 A |
|---|---|---|---|---|---|---|
| 4,716,142 | A | | 12/1987 | Laine et al. | ................ | 502/220 |
| 5,023,226 | A | * | 6/1991 | Immel et al. | ............... | 502/313 |
| 5,274,187 | A | * | 12/1993 | Kimura et al. | ............... | 562/538 |
| 5,543,379 | A | * | 8/1996 | Gubitosa et al. | ............ | 502/184 |
| 5,643,670 | A | * | 7/1997 | Chung | ......................... | 428/367 |
| 5,702,836 | A | | 12/1997 | Ma et al. | ........................ | 429/13 |
| 5,786,026 | A | * | 7/1998 | Seko et al. | ................. | 427/115 |
| 5,856,260 | A | * | 1/1999 | Mauldin | ..................... | 502/325 |
| 6,007,934 | A | * | 12/1999 | Auer et al. | .................... | 429/44 |
| 6,066,410 | A | * | 5/2000 | Auer et al. | .................... | 429/40 |
| 6,146,782 | A | * | 11/2000 | Wendt et al. | .................. | 429/42 |
| 6,284,402 | B1 | * | 9/2001 | Mallouk et al. | ............... | 429/40 |

FOREIGN PATENT DOCUMENTS

| EP | 838872 | 4/1996 |
|---|---|---|
| EP | 827225 | 3/1998 |
| WO | WO 98/40161 | 9/1998 |

OTHER PUBLICATIONS

"The Future of Fuel Cells," Scientific American, Jul. 1999, p. 72–73.
Appleby, John, "The Electrochemical Engine for Vehicles," Scientific American, Jul., 1999, p. 74–79.
Lloyd, Alan, "The Power Plant in Your Basement," Scientific American, Jul., 1999, p. 80–86.
Dyer, Christopher, "Replacing the Battery in Portable Electronics", Scientific American, Jul., 1999, p. 88–93.
"Battery Boosters", PC Magazine, Oct. 5, 1999, p. 28.

(List continued on next page.)

Primary Examiner—Stanley S. Silverman
Assistant Examiner—Cam N. Nguyen
(74) Attorney, Agent, or Firm—Fitzpatrick, Cella, Harper & Scinto

(57) ABSTRACT

High activity, supported, nanosized metallic catalysts for methanol reformation and methods of fabricating such catalysts are disclosed. In one embodiment, soluble metal species are dissolved in a polyhydroxylic alcohol (polyol) solution. Platinum and ruthenium are preferred metal species. Other soluble metal species can be used, such as soluble Group 6, 7 and 8 metals. The polyol solvent is preferably a viscous alcohol, such as a diol, triol, or tetraol, to minimize particle diffusion and inhibit particle growth. The polyol solution is heated to reduce the metal(s) to a zero valent state. Typically, the heating temperature will range from 20° C. to 300° C., and the heating period will range from 1 minute to 5 hours. A high surface area conductive support material can be mixed with the polyol solution to form the supported catalysts in situ. Activated carbon, metals, and metal oxides, having a surface area from 20 to 2000 $m^2/g$, are typical support materials.

30 Claims, 10 Drawing Sheets

OTHER PUBLICATIONS

Reddington, Erik, et al., "Combinatorial Electrochemistry: A Highly Parallel, Optical Screening Method for Discovery of Better Electrocatalysts," Science Magazine, (date unknown).

Kua, Jeremy, et al., "Oxidation of Methanol on 2nd and 3rd Row Group VIII Transition Metals (Pt, Ir, Os, Pd, Rh, and Ru): Application to Direct Methanol Fuel Cells," American Chemical Society, vol. 121, No. 41, 1999, p. 10928–10941.

Friedrich, Holger B., " The Oxidation of Alcohols to Aldehydes or Ketones," Platinum Metal Rev., 1999, p. 94–102.

Teranishi, Toshiharu, "Novel Synthesis of Monodipersed Pd/Ni Nanoparticles," American Chemical Society, 1999.

Nasher, Michael S., et al., "Core Shell Inversion during Nucleation and Growth of Bimetallic Pt/Ru Nanoparticles," American Chemical Society, vol. 120, No. 32, 1998, p. 093–8101.

Liu, Li, "Carbon Supported and Unsupported PT/Ru Anodes for Liquid Feed Direct Methanol Fuel Cells," Electrochimica Acia, vol. 43, No. 24, pp. 3657–3663.

Lin, Shawn D., et al., "Morphology of Carbon Supported Pt/Ru Electrocatalyst and the CO Tolerance of Anodes for PEM Fuel Cells," American Chemical Society, vol. 103, No. 1, 1999, pp. 97–103.

Miyazaki, Akane, et al., "Formation of Ruthenium Colloid in Ethylene Glycol," Chemistry Letters, 1998, p. 361–62.

Kurihara, L.K., et al., "Nanocrystalline Metallic Powders and Films Produced by the Polyol Method," NanoStructured Materials, vol. 5, No. 6, 1995, p. 607–613.

Zhang, Yue, et al., "Molecular Design Considerations In the Synthesis of High Conductivity Pems for Fuel Cells," p. 480–81 (date and source unknown).

Wang, et al., "Preparation of Tractable Platinum, Rhodium, and Ruthenium Nanoclusters with Small Particles Size in Organic Media," Chem. Mater, vol. 12, No. 6, 2000, pp. 1622–1627.

* cited by examiner-

PREPARATION OF SUPPORTED NANO-SIZED CATALYST PARTICLES VIA A POLYOL PROCESS

TECHNICAL FIELD

The present invention relates to the synthesis of mixed-metal catalysts, more particularly, high activity, long life, alcohol reforming catalysts, especially methanol, based upon nanosize Pt/Ru particles supported on an electroactive support, especially carbon.

BACKGROUND ART

Battery packs are currently the worldwide portable/emergency power source of choice for electrical devices. Researchers have long sought to develop small footprint fuel cells to replace rechargeable battery packs. Fuel cells offer efficient and direct conversion of the chemical energy stored in fuels to electricity in a very environmentally friendly (low polluting) fashion. In principle, fuel cells offer the potential to achieve higher power densities per unit volume, longer use times, and longer total equipment lifetimes than standard battery packs. Long term, this translates to lower cost, higher utility, and increased mobility.

For example, depending on device performance specifics, a battery pack for a laptop computer can provide ≈40–50 W-h of energy. If the laptop requires an average of 20 watts of power to run, then the battery pack can provide only 2–3 h of running time before requiring recharging. Although larger batteries can be used, one pays a price in weight and convenience (size). Furthermore, recharging requires access to a power grid. In contrast, a similar sized fuel cell based on methanol is anticipated to produce 50 W of power and last for 10–20 h before total methanol consumption. In this instance, replacing a used canister of methanol with another does not require access to a power grid (not rechargeable), provides instant continuity and saves weight if it replaces a second, backup battery. Finally, if lost or destroyed, a methanol canister will be easier to replace and much lower in cost than a high-tech, high-density battery pack.

The most efficient fuel cells use $H_2$ as the reductant, and oxygen or air as the oxidant. The more advanced $H_2$ based fuel cells can produce 0.8–1.0 A/cm² at ≈0.7 V (0.5 W/cm²) with performance lifetimes measured in hundreds of hours. Unfortunately, the cost and weight required to store large quantities of gaseous $H_2$, even as metal hydrides, are major drawbacks. Hence, fuel cells that use liquid hydrocarbon fuels, especially methanol (MeOH), are the focus of commercialization efforts.

Two of the more promising direct methanol fuel cell systems are the polyphosphoric acid fuel cell and the proton exchange membrane fuel cell (PEMFC). PEM based fuel cells are more convenient to work than polyphosphoric acids because they employ a solid acid electrolyte, e.g. Nafion® membrane.

The drawback to using MeOH as a fuel is that energy output can be much lower than hydrogen, typically in the 300–500 mA range at 0.5 to 0.3 V. For short runs, 0.8 A/cm² at ≈0.5 V (0.25 W/cm²) have been achieved. In part, the lower performance is due to CO and/or methanol poisoning of the cathode due to crossover through the membrane (CO and MeOH compete with $O_2$ for active catalyst sites). In part, this difference is due to the need to catalytically reform MeOH at the anode coincident with reacting the product hydrogen with oxygen, some efficiency is lost in the process. The methanol reforming reaction (1) is shown below:

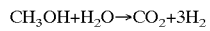   (1)

For example, platinum metal by itself is an excellent catalyst for hydrogen fuel cells based on:

   (2)

However, CO (a typical impurity in many $H_2$ sources) competes with $H_2$ for active catalytic sites on Pt metal particles and readily poisons the catalyst. Thus, CO coverage of active catalyst sites limits the rate at which reaction (2) proceeds.

MeOH reforming, as shown in reaction (1), can actually proceed via two stepwise processes that can involve the formation of CO and/or $CO_2$:

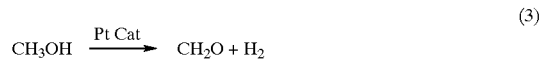   (3)

   (4)

   (5)

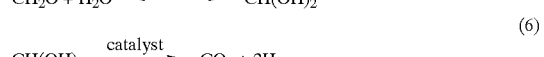   (6)

The CO produced via reaction (4), is very effective in poisoning simple Pt catalysts. The actual problem lies in the fact that Pt metal alone is not an effective catalyst for the water-gas shift reaction, reaction (7), making CO difficult to remove from the surface.

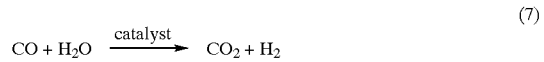   (7)

For the direct methanol fuel cell to be successful, an effective catalyst that promotes reaction (7) as part of the overall methanol reforming reaction is needed. Ruthenium is one of several metals that aid in promoting reaction (7).

Thus, improving the efficiency and activity of the MeOH reforming catalyst is desirable. A higher efficiency catalyst means less of the precious metal catalyst is required, and higher activity will minimize CO crossover poisoning of the cathode. It will be appreciated that there is a need in the art for highly active and efficient methanol reforming catalysts.

DISCLOSURE OF THE INVENTION

The present invention is directed to high activity, supported, nanosized mixed-metal catalysts, especially Ru/Pt catalysts for methanol reformation, and to methods of fabricating such catalysts. These methanol reformation catalysts are useful in methanol fuel cells, particularly portable, small footprint fuel cells such as polymer electrolyte membrane fuel cells (PEMFCs) that use methanol as a primary fuel source.

In a currently preferred embodiment within the scope of the present invention, the soluble metals are dissolved in a polyhydroxylic alcohol (polyol). The ratio of $M_1:M_2:M_3:M_4$ will typically vary from (0.001 to 1):(0.001 to 1):(0.001 to 1):(0.001 to 1). Presently preferred catalysts typically contain Ru and Pt, with or without additional metals. The ratio of Ru:Pt will typically vary from 0.001:1 to 1:0.001, and preferably from 0.1:1 to 1:0.1, and more preferably from 0.5:1 to 1:0.5. The polyols are preferably viscous alcohols to minimize diffusion and thereby prevent particle growth. Typical polyols used in accordance with the present invention include organic diols, triols, and tetraols. Ethylene glycol, glycerol, triethanolamine, and trihydroxymethylaminomethane are examples of currently preferred polyols. In the polyol process one has two choices, (1) make the colloid in the absence of support and then deposit it on the support or (2) make it in the presence of the support such that the support aids in minimizing particle growth. A typical example of each option is described below, realizing that variations of these examples can be made by persons having ordinary skill in the art.

Typical Colloid Preparation Procedure

An amount of metallic precursor (or precursors) is added to 100 mL of refluxing ethylene glycol. The reaction mixture is refluxed for 15 min. A first aliquot is taken out and quenched in water at ice-water bath temperatures. The quenched solution is centrifuged several times by decanting supernatant and washing with ethanol. A second aliquot is taken after 1 h and same workup process is applied. Samples are then vacuum dried overnight. These materials can then be redispersed in alcohol and deposited on a known amount of pretreated support material, such as carbon black.

Typical Supported Powder Preparation Procedure

An amount of metallic complex ($M_1$ such as Ru complex) and an equivalent amount (by weight or mole) of a second metallic complex ($M_2$, such as Pt complex) are dissolved in 10 mL of ethylene glycol, respectively. The two solutions are mixed and then added to a dispersion consisting of a weighed amount of support material, such as activated carbon, in 80 mL of ethylene glycol. The resulting mixture is refluxed and samples are taken after 15 minutes and 1 hour. Samples are quenched as above. The quenched solutions are centrifuged several times by decanting supernatant and washed with ethanol. Finally samples are vacuum dried overnight. The resulting catalyst is ready to use as is. Sometimes, it is flammable if kept from air during the preparation procedure.

The resulting catalysts include nanometallic powders on a support, bimetallic powders on a support, polymetallic nanopowders on a support, high surface area powders on a high surface area support, and low porosity metal nanopowders on a support.

The polyol solution is heated to a temperature in the range from 20° C. to 300° C. to reduce the metallic precursors to a zero valent state. If mixed with a support material, the mixed metallic catalyst particles form on the support material. The mixture is preferably heated to a temperature in the range from 60° C. to 220° C., and more preferably the mixture is heated to a temperature in the range from 70° C. to 190° C. The time required to heat the mixed-metal catalyst can vary, but the typical heating period generally ranges from 1 minute to 24 hours. Preferably, the heating period ranges from 1 minute to 5 hours, and more preferably, the heating period ranges from 1 minute to 1 hour.

The concentration of metallic precursors, such as Ru and Pt, affects the resulting mixed-metal catalyst particle size. Higher concentrations result in more particle growth and larger average particle size. The resulting mixed-metal catalyst particles typically have a particle size less than 1 $\mu$m, preferably less than 0.1 $\mu$m, and more preferably less than 0.05 $\mu$m. Systems where the catalyst loading approaches that of the mass of the support are more prone to produce micron size metal particles on the support than nanometer size particles in support pores. Preferable loadings are less than 50 wt. % of catalyst to support weight. In addition, the amount of polyol used per gram of support/catalyst also affects the size of the metal particles simply on a dilution effect basis. Larger polyol volumes give smaller catalyst particles, even on the support.

For Pt/Ru catalysts, typical soluble metal species include, but are not limited to, $PtCl_2$, $H_2PtCl_6$, $Pt_2(dba)_3$ (dba=dibenzylideneacetone), Pt(dvs) (dvs=divinyltetramethyldisiloxane), $Pt(Oac)_2$ (Oac=acetate), $Pt(acac)_2$ (acac=acetylacetonate), $Na_2PtCl_6$, $K_2PtCl_6$, platinum carbonate, platinum nitrate, platinum perchlorate, platinum amine complexes, $RuCl_3 \cdot xH_2O$, $Ru(acac)_3$, $Ru_3(CO)_{12}$, $Ru(Oac)_3$, ruthenium nitrate, ruthenium perchlorate, ruthenium amine complexes, and mixtures thereof. Soluble platinum and ruthenium compounds are commercially available from a variety of vendors such as Strem Chemicals (Danbury, Mass.), Alfa Asear (Ward Hill, Mass.), and Aldrich (Milwaukee, Wis.). Other soluble metal species can be included in such as $CuCl_x$, $Cu(Oac)_x$, $CoCl_x$, $Co(Oac)_x$, and soluble Group 6, 7 and 8 metals. These metals can be used to aid in the water-gas shift reaction, reaction (7), or in forming stable metal hydrides for eliminating hydrogen, or to electronically modify the properties of the other metals in the mixed-metal catalysts.

Low metal loading on the support material is preferred. The soluble metallic precursors preferably have concentrations in the polyol sufficient to yield a metal loading on the support less than 100 wt. % metal to 100 wt. % support. More preferably, the metal loading on the support is less than 50 wt. % metal to 100 wt. % support, and most preferably less than 20 wt. % metal to 100 wt. % support. The catalyst loading is preferably in the range from 0.1 to 0.5 mg/cm$^2$ of the support.

The support material preferably has a high surface area in the range from 10 to 2000 m$^2$/g. More preferably, the support material has a surface area in the range from 200 to 1500 m$^2$/g, and most preferably from 300 to 1500 m$^2$/g. The high surface area is a result of an open porous structure. The support material preferably has pores sufficiently small to capture nanoparticles, but not too small to interfere with gas/liquid flow. Typical pore sizes will be in the range from 1 nm to 100 nm. Preferably, the pore size is in the range from 1 nm to 30 nm, and more preferably from 1 to 10 nm. Carbon is a currently preferred support material because of its high surface area and porosity, as well as its electrical conductivity properties. Other support materials can be used, including conductive metals and metal oxides such as indium tin oxide, silver, gold, Pt/Ag alloys, copper, and indium zinc oxides.

It will be appreciated that the present invention provides methods of preparing supported, mixed-metal MeOH reforming catalysts that are highly active and efficient.

DETAILED DESCRIPTION OF THE PREFERRED EMBODIMENTS

Figure 1:
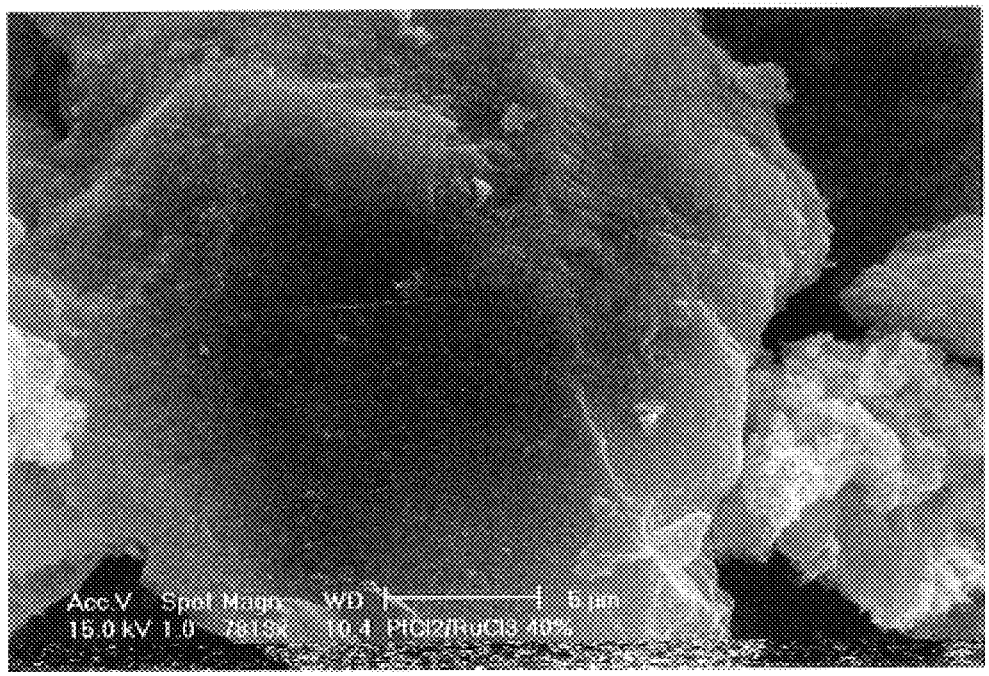
FIG. 1 is a field emission scanning electron micrograph (FE-SEM) of a single carbon particle for a PtCl$_2$/RuCl$_3$ 40 wt. % loading on 1500 m$^2$/g pretreated carbon.

The present invention is directed to high activity, supported, nanosized mixed-metal catalysts, and more particularly to methanol reformation catalysts and to methods of fabricating such catalysts. In a currently preferred embodiment within the scope of the present invention, the catalysts are prepared using a polyhydroxylic alcohol (polyol) to reduce the metal species. In this polyol approach, soluble metals are dissolved in a polyhydroxylic alcohol. The polyols used are preferably viscous alcohols to minimize diffusion and inhibit particle growth. The alcohol viscosity will typically range from 1 to 1000 cp, more preferably from 50 to 500 cp, and most preferably from 100 to 250 cp. The metal/polyol solution is heated to coincidentally reduce the metals and produce polyol stabilized metal colloid particles. The metal colloid can be prepared in the absence of a support material and then deposited on the support to form the catalyst, or the metal colloid can be prepared in the presence of the support, in situ.

It has been observed that the presence of a support material helps to prevent aggregation and particle growth of the product colloids. It also helps achieve well-dispersed nano-sized metal particles. Thus, it is presently preferred to prepare the supported catalysts in situ.

EXAMPLES

The following examples are given to illustrate various embodiments within the scope of the present invention. These are given by way of example only, and it is to be understood that the following examples are not comprehensive or exhaustive of the many embodiments within the scope of the present invention.

Examples 1 and 2, below illustrate the preparation of carbon supported bimetallic catalysts.

Example 1

Formation of Metallic Colloids by Polyol Process

An amount of metallic precursor (or precursors) was added to 100 mL of refluxing ethylene glycol. The reaction mixture was refluxed for 15 min. A first aliquot was taken out and quenched in water at ice-water bath temperatures. The quenched solution was centrifuged several times by decanting supernatant and washing with ethanol. A second aliquot was taken after 1 h and same workup process was applied. Samples were then vacuum dried overnight. As a modified process, treated activate carbon was added to a solution of the precursor or precursor after refluxing 15 min. Then the resulting suspension was refluxed for 5 min. and then the sample was taken.

High surface area activated carbon (Aldrich) was used. The carbon black was pretreated to remove oxidation products, moisture, and organic volatiles on its outer surface. This was accomplished by heating the carbon black in an air-free environment. One-gram samples of carbon were heated in a Micromeritics ASAP 2000. This removed typical impurities by first drying under vacuum at 200° C. for several hours and then degassing them at 400° C. overnight (12 h). The resulting materials showed surface areas of 1500 $m^2/g$ per the specification sheets.

A summary of the types of variables studied in the simple formation of colloids is given in Table 1.

TABLE 1

Reaction variables for the preparation of bimetallic colloids subsequently impregnated on activated carbon support

| | description of sample | | | |
|---|---|---|---|---|
| Sample no. | wt. $RuCl_3$ | wt. $PtCl_2$ | wt. AC* | rxn. Time |
| 1 | 0.06 g | | | 15 min. |
| 2 | 0.02 g | 0.02 g | | 11 min. |
| 3 | 0.02 g | 0.02 g | | 20 min. |
| 4 | 0.02 g | 0.02 g | | 3 hours |
| 5 | 0.02 g | | 0.2 g | 1 hour |
| 6* | 0.01 g | 0.01 g | 0.05 g | 15 min. |
| 7 | 0.01 g | 0.01 g | 0.05 g | 15 min. |
| 8 | 0.02 g | 0.02 g | 0.2 g | 1 hour |

*Activated carbon was added 15 min. after the solution was refluxed.

Mechanism of Particle Formation

The reduction of the metal precursors (or mixtures of precursors) by the polyol process produces nano-sized metal (or bimetallic or polymetallic) particles. The size of particles formed without carbon were in the range of 50–100 nm and in the presence of carbon cannot really be seen by scanning electron microscopy.

The nanosized particles obtained in this Example were bigger than those obtained by Miyazaki et al., "Formation of Ruthenium Colloid in Ethylene Glycol," *Chemistry Letters*, pp. 361–62, 1998. This difference in size is probably due to different concentrations of starting materials and the reaction scale. When more concentrated solutions are used, the size of particles increases because the number of nucleation sites is likely concentration dependent and growth then competes effectively with further nucleation. Also, the use of smaller scale (less solvent) increases the efficiency of heat transfer, which also accelerates the growth of particles.

As noted above, the use of activated carbon helps to prevent aggregation of colloids. Thus, the addition of activated carbon as a dispersing matrix appears to be important in obtaining well-dispersed, nano-sized bimetallic particles.

Example 2

In Situ Impregnation of Bimetallic Nanoparticles Formed by Polyol Process

An amount of Ru complex and an equivalent amount (by weight or mole) of Pt complex were dissolved in 10 mL of ethylene glycol, respectively. The two solutions were mixed and then added to a dispersion consisting of a weighed amount of activated carbon in 80 mL of ethylene glycol. The resulting mixture was refluxed and two samples taken after 15 min. and 1 h. Samples were quenched as above. The quenched solutions were centrifuged several times by decanting supernatant and washed with ethanol. Finally samples were vacuum dried overnight.

Variations of this example are disclosed in Table 2, below.

impregnated carbon likely indicates that the catalyst particles fill the necks and pores of the carbon. This is also an indirect indication that the particle sizes are small enough to fit in these pores (typically<100 nm) and therefore are very well dispersed. If large particles had formed very little change in surface area would be expected. XRD analysis of

TABLE 2

Pt/Ru bimetallic catalysts impregnated coincidentally on activated carbon

| Sample | | | | | | | Rxn. time | |
|---|---|---|---|---|---|---|---|---|
| No. | Description | $PtCl_2$ | $H_2PtCl_6$ | $RuCl_3$ | C* | EG | 15 min | 1 hr |
| 1 | 20 wt % loading (Pt + Ru) | | 0.021 g (10 ml) | 0.02 g (10 ml) | 0.1 g (30 ml) | 50 ml | | |
| 2 | 20 wt % loading (Pt + Ru) | 0.014 g (10 ml) | | 0.02 g (10 ml) | 0.1 g (30 ml) | 50 ml | | |
| 3 | 40 wt % loading (Pt + Ru) | | 0.042 g (10 ml) | 0.04 g (10 ml) | 0.1 g (30 ml) | 50 ml | | |
| 4 | 40 wt % loading (Pt + Ru) | 0.027 g (10 ml) | | 0.04 g (10 ml) | 0.1 g (30 ml) | 50 ml | | |
| 5 | $PtCl_2$/EG | 0.054 g (20 ml) | Black ppt. with gentle heating | | | | | |
| 6 | 40 wt % loading (Pt + Ru) | | 0.042 g (10 ml) | 0.04 g (10 ml) | 0.1 g (130 ml) | 150 ml | | |
| 7 | 40 wt % loading (Pt + Ru) | 0.027 g (20 ml) | | 0.04 g (10 ml) | 0.1 g (120 ml) | 150 ml | | |
| 8 | 40 wt % loading Ru | | | 0.08 g (20 ml) | g (30 ml) | 50 ml | | |
| 9 | 40 wt % loading Pt | 0.054 g (30 ml) | | | 0.1 g (20 ml) | 50 ml | | |
| 10 | 60 wt % loading (2 Pt + Ru) | | 0.084 g (20 ml) | 0.04 g (20 ml) | 0.1 g add | 50 ml | | |
| 11 | 60 wt % loading (2 Pt + Ru) | 0.054 g (20 ml) | | 0.04 g (20 ml) | 0.1 g add | 50 ml | | |
| 12 | 60 wt % loading (Pt + 2 Ru) | | 0.042 g (20 ml) | 0.08 g (20 ml) | 0.1 g add | 50 ml | | |
| 13 | 60 wt % loading (Pt + 2 Ru) | 0.027 g (20 ml) | | 0.08 g (20 ml) | 0.1 g add | 50 ml | | |
| 14 | 100 wt % loading (Pt + Ru) | | 0.105 g (20 ml) | 0.1 g (20 ml) | 0.1 g add | 50 ml | | |
| 15 | 100 wt % loading (Pt + Ru) | 0.068 g (20 ml) | | 0.1 g (20 ml) | 0.1 g add | 50 ml | | |
| 16 | 100 wt % loading (Pt + Ru) | | 0.21 g (20 ml) | 0.1 g (20 ml) | 0.2 g add | 100 ml | | |
| 17 | 100 wt % loading (Pt + Ru) | 0.136 g (20 ml) | | 0.2 g (20 ml) | 0.1 g add | 100 ml | | |
| 18 | 20 wt % loading (Pt + Ru) | | 0.042 g (20 ml) | 0.04 g (20 ml) | 0.2 g add | 100 ml | | |
| 19 | 20 wt % loading (Pt + Ru) | 0.027 g (20 ml) | | 0.04 g (20 ml) | 0.2 g add | 100 ml | | |
| 20 | 20 wt % loading (Pt + Ru) | | 0.042 g (20 ml) | 0.04 g (20 ml) | 0.2 g add | 150 ml | | |
| 21 | 20 wt % loading (Pt + Ru) | 0.027 g (20 ml) | | 0.04 g (20 ml) | 0.2 g add | 150 ml | | |
| 22 | 10 wt % loading (Pt + Ru) | | 0.042 g (20 ml) | 0.04 g (20 ml) | 0.4 g add | 100 ml | | |
| 23 | 10 wt % loading (Pt + Ru) | 0.027 g (20 ml) | | 0.04 g (20 ml) | 0.4 g add | 100 ml | | |
| 24 | 10 wt % loading (Pt + Ru) | | 0.042 g (20 ml) | 0.04 g (20 ml) | 0.4 g add | 150 ml | | |
| 25 | 10 wt % loading (Pt + Ru) | 0.027 g (20 ml) | | 0.04 g (20 ml) | 0.4 g add | 150 ml | | |
| 26 | 40 wt % loading (Pt + Ru) | 0.054 g (20 ml) | | 0.04 g (20 ml) | 0.2 g add | 100 ml | | |
| 27 | 40 wt % loading (Pt + Ru) | | 0.084 g (20 ml) | 0.04 g (20 ml) | 0.2 g add | 100 ml | | |

Several samples were characterized by field emission SEM (FE-SEM). X-ray diffraction (XRD) and surface area analysis were also performed.

As noted above, the surface area of treated Aldrich activated carbon was 1500 $m^2$/g. Following a typical catalyst preparation procedure, see above, the surface area dropped to about 1000 $m^2$/g. The reduced surface area of the an impregnated carbon exhibited broad peaks indicative of nanosized Ru/Pt alloy particles.

The general results suggest that if the polyol process was carried out with too high a metal concentration and without support material (approximately 0.01 to 0.1 M), then larger (1–10 μm diameter particles) were seen, and the resulting materials precipitated out of solution easily. If lower concentrations (0.001 M) were used, the solutions typically remained brown as the colloidal particles remained suspended. SEMs of the precipitated materials provided clean images of particles but SEM images of the nanosized particles were poor as expected, since the resolution of FE SEMs is poor below ≈0.5 µm. Likewise, in the presence of the pretreated carbon black, essentially no metal particles were visible.

A preliminary EDS element mapping study shows that the Ru and Pt were uniformly distributed throughout the carbon materials supporting the formation of evenly distributed bimetallic nanoparticles.

The FIG. 1 FE-SEM micrograph shows a single carbon particle for a $PtCl_2/RuCl_3$ 40 wt % loading on 1500 $m^2/g$ pretreated carbon. The scale bar is 5 µm. Metal particles, because of their much higher electron density, should be readily visible in this micrograph if they were at the 0.5 µm size. Given that there is no indication of such particles, one can conclude that the catalyst particles are likely to be much smaller. This was confirmed in the FIG. 2 micrograph, which is at the highest SEM magnification possible. The white particles on the image are metal particles.

Figure 2:
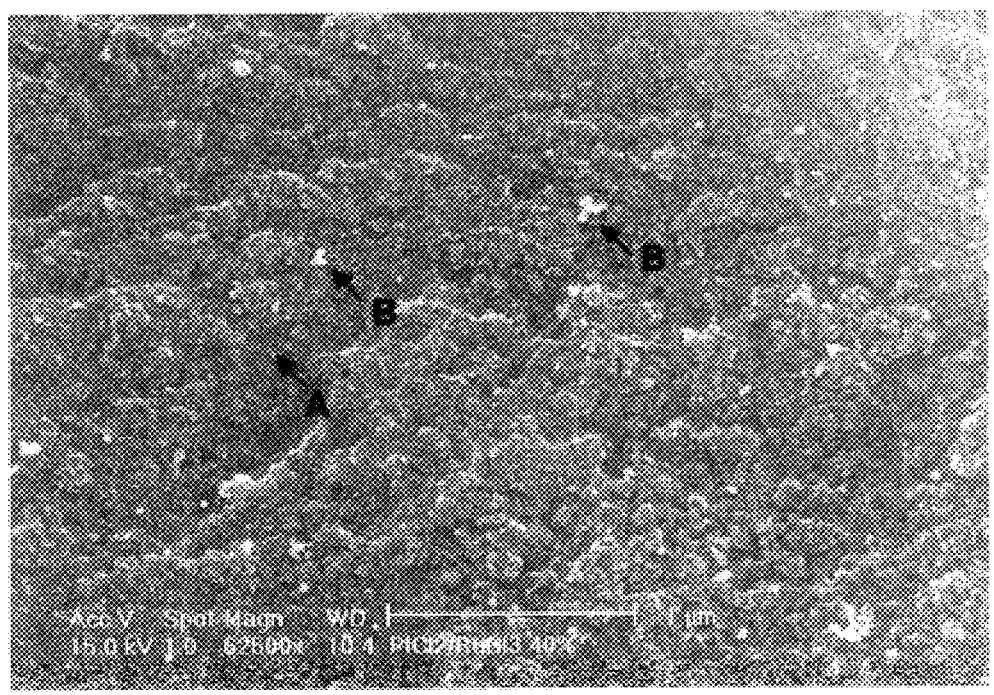
FIG. 2 is a FE-SEM of a single carbon particle for a PtCl$_2$/RuCl$_3$ 40 wt. % loading on 1500 m$^2$/g pretreated carbon at maximum SEM magnification.

Arrow A appears to point to a particle<25 nm in diameter. The particles identified by Arrows B are 50 to 100 nm in size. Furthermore, no pores are visible, indicating that the porosity is extremely fine. The material shown in FIG. 2 is a catalyst that has a 40 wt. % loading. Because much of the metal cannot be seen as distinct particles, it is likely well dispersed and probably in the pores of the carbon. This may be a problem as noted above because fine porosity may create mass transport limitations, which in turn may limit the catalyst activity, not the degree of metal dispersion.

Figure 3:
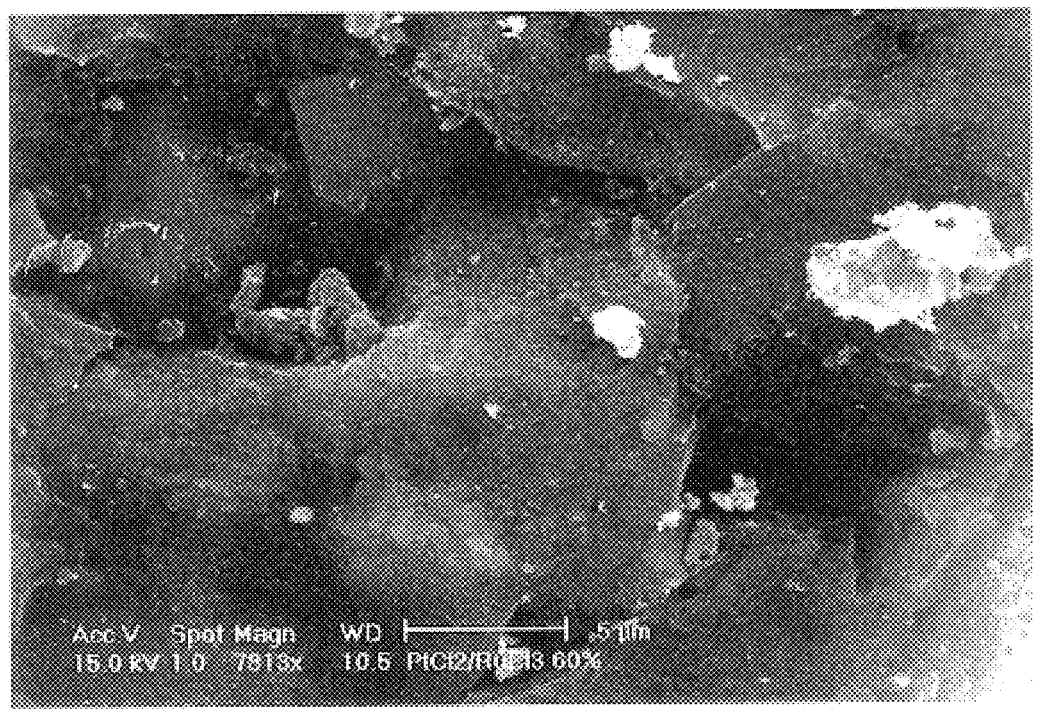
FIG. 3 is a FE-SEM of PtCl$_2$RuCl$_3$ 60 wt. % loading on 1500 m$^2$/g pretreated carbon.
Figure 4:
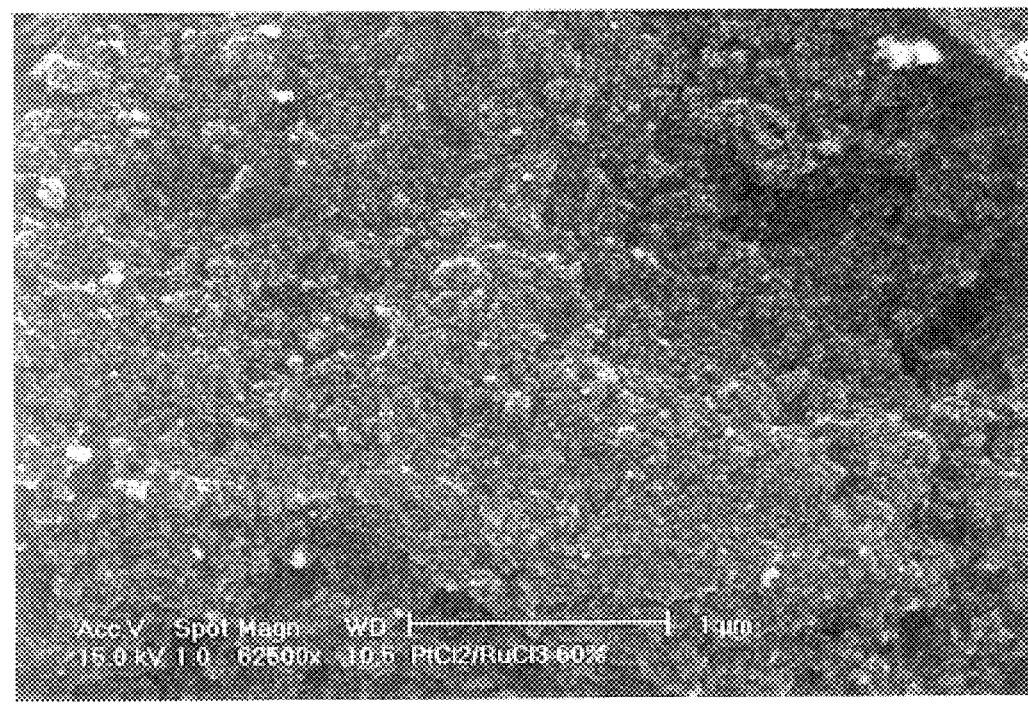
FIG. 4 is a FE-SEM of PtCl$_2$/RuCl$_3$ 60 wt. % loading on 1500 m$^2$/g pretreated carbon at maximum SEM magnification.

FIG. 3 is a micrograph for a $PtCl_2/RuCl_3$ 60 wt % loading on 1500 $m^2/g$ pretreated carbon. It suggests that there may be some agglomeration of metal particles. At the 5 µm scale there are clearly some very large particles of metal on the surface. Some of them appear to have a size of about 5 µm, but these may be agglomerates. In addition, the amount of metal loaded onto the support is of nearly the same mass as the carbon black. Although there is a significant difference in the density of the carbon (<1.8 g/cc) compared to the metals (>5 g/cc), if the metal were not well dispersed it would be quite obvious. Also, based on the higher magnification micrograph of the same material, shown in FIG. 4, it is likely that the above large metal particles are rare. In summary, it appears that the polyol process works well and provides reasonable, if not excellent, dispersions.

Qualitative Testing Using a Parr Pressure Reactor

To assess qualitatively the catalytic activity of prepared samples, 5 ml of MeOH and 5 ml of $H_2O$ were added to a 45 ml vol. Parr reactor with a small amount of catalyst (25 mg for samples 1, 14, and 15, and 50 mg for samples 17 and 19, see Table 2) in air. Then the reactor was then sealed, degassed 3× with nitrogen and heated to 100°, 150°, and 180° C. using an oil bath. A blank run without catalyst was also run. The pressure build-up was 150 psi at 150° C. and 200 psi at 180° C.

For selected runs with a catalyst with 100% loading [1:1 metal (Ru:Pt of 1:1): carbon], pressures of 150 psi at 150° C. and 300 psi at 180° C. over a period of 12 h. However, similar studies with a 20% loading gave the same results suggesting that equilibrium was reached early on. The pressure increase was assumed to result from production of $CO_2$ and $H_2$.

Example 3

In Situ Impregnation of Trimetallic Nanopowder Catalyst on Support Formed by the Polyol Process In this synthesis, 1.000 g activated carbon, but not pretreated, was suspended in 800 mL EG. The solution was refluxed under $N_2$ flow for a period ≦2 h to degas it.

A 1:1:1 molar concentration of Pt:Ru:Cu solution was made using 0.265 g of $PtCl_2$ dissolved in 67 mL EG (stirred overnight to ensure complete dissolution), 0.207 g $RuCl_3$ dissolved in 67 mL EG (also stirred overnight), and 0.201 g $Cu(Oac)_2.2H_2O$ dissolved in 66 mL EG and stirred overnight. To each of the three solutions was added 2 mL $H_2O$ to facilitate dissolution.

The three solutions were combined and stirred together for a 2–3 h period. Simultaneously, the activated carbon/EG solution was refluxed for 25 min, cooled, and the 200 mL Pt/Ru/Cu solution was syringed into this carbon/EG solution. This new solution was refluxed for 15 minutes and then cooled in a water bath overnight. The catalyst settled to the bottom of the flask and was recovered by centrifugation. The catalyst was then dried overnight in a heating oven at 120° C.

Example 4

In Situ Impregnation of Trimetallic Nanopowder Catalyst on Support Formed by the Polyol Process In this synthesis, 1.000 g activated carbon, but not pretreated, was suspended in 800 mL EG. The solution was refluxed under $N_2$ flow for ≦2 h to degas it.

A 1:1:1 molar concentration of Pt:Ru:Co solution was made using 0.265 g of $PtCl_2$ dissolved in 67 mL EG (stirred overnight to ensure complete dissolution), 0.207 g $RuCl_3$ dissolved in 67 mL EG (also stirred overnight), and 0.130 g $Co(Cl)_2.2H_2O$ was dissolved in 70 mL EG and stirred overnight. To each of the three solutions was added 2 mL $H_2O$ to facilitate dissolution.

The three solutions were combined and stirred together for 2–3 h. Simultaneously, the activated carbon/EG solution was refluxed for 25 min, cooled, and the 200 mL Pt/Ru/Co solution was syringed into this carbon/EG solution. This new solution was refluxed for 15 minutes and then cooled in a water bath overnight. The catalyst settled to the bottom of the flask and was recovered by centrifugation. The catalyst was then dried overnight in a heating oven at 120° C.

Example 5

Quantitative Testing of Catalyst Activity

A computer controlled, gas/liquid phase catalyst test system was used to quantitatively measure catalyst activity in the methanol reforming reaction. $MeOH/H_2O$ mixtures were metered via a HPLC pump directly (as gases or liquids) onto preheated catalyst samples (10–50 mg). The reacted gases and/or liquids were transported via a heated transfer line to a computer controlled gas chromatograph, and the amounts of products and reactants were measured from known standards, and the rates of reactions and catalyst activities were computed. The activity of commercially available methanol reforming catalysts from EBTech and ElectroChem was also examined.

A standardized test system was established for both dynamic and static test conditions. These conditions are as follows:

| Catalytic reactor test conditions | |
| --- | --- |
| Molarity of solution: | 2M MeOH, 3M $H_2O$ |
| Solution feed rate: | 0.02 mL/min |

-continued

Catalytic reactor test conditions

| | |
|---|---|
| Sample loop length: | 26 cm (dia. 0.22 cm): volume 100 ≈ μl |
| Reaction temperature: | 140° C. |
| Catalyst loading size: | 500 mg for ElectroChem [40 wt. % metal (30 wt. % Pt, 10 wt. % Ru], |
| | 50 mg for synthesized catalysts |
| Static conditions: | After 5 h under dynamic conditions |

Gas Chromatography Studies

Figure 5:
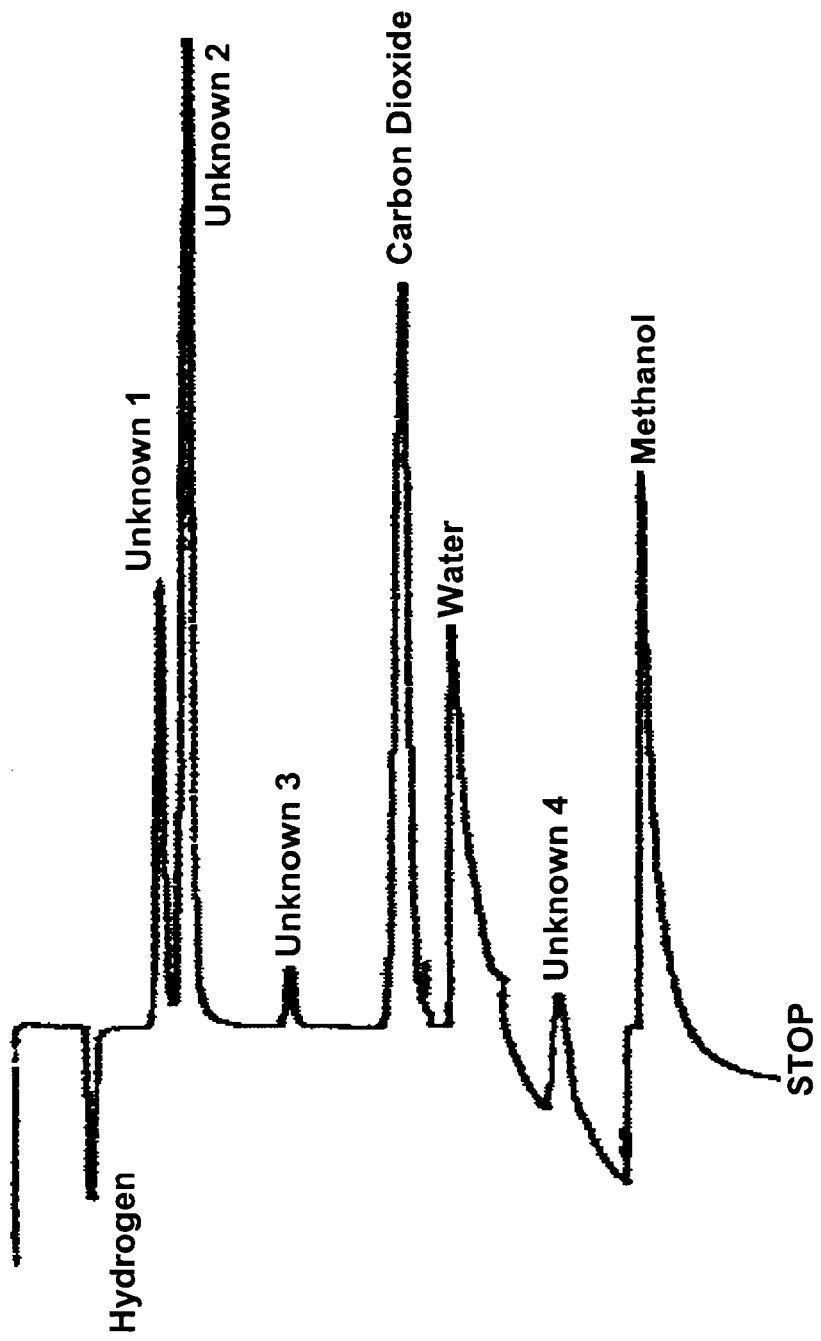
FIG. 5 is a graph of a typical gas chromatogram of methanol reforming reaction products from an active catalyst and support.

FIG. 5 shows a typical gas chromatogram from an active catalyst running in dynamic mode. There are several points to be made: First, a blank reaction without catalyst shows only the MeOH and $H_2O$ peaks and nothing else. No dissolved air is present in the system. Second, the hydrogen elutes first, and because of its lower heat capacity then the helium carrier gas, it appears as a negative peak. Third, the unknowns have not been identified but are likely the compounds shown below:

| Order of Importance | Size Order-Likely elution seguence from GC |
|---|---|
| CO | CO |
| $H_2C = O$ | $CH_4$ |
| $CH_2(OCH_3)_2$ | $H_2C = O$ |
| $CH_4$ | $CH_2(OCH_3)_2$ |

Unknown one or two is probably CO and the other is probably methane. The $CH_2(OCH_3)_2$ compound is a potentially very interesting material formed per:

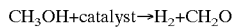

$$CH_3OH + catalyst \rightarrow H_2 + CH_2O$$

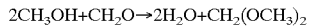

$$2CH_3OH + CH_2O \rightarrow 2H_2O + CH_2(OCH_3)_2$$

The methoxyacetal derivative represents a denser form of methanol and might actually be a better fuel if the fuel can be stored as the acetal and methanol recovered only on addition of water selectively at the anode. This would be helped by an acid catalyst, which would promote the reverse reaction.

Fourth, because the reactions are run, under dynamic conditions where the absolute amounts of MeOH and water do not change significantly, only buildup of the $CO_2$ peak represents a reliable measure of catalyst activity. For reactions that switch over to static it is possible to follow both MeOH and $H_2O$ consumption but not with the amounts of catalysts (50 mg) used for the synthesized catalyst studies.

Based on these provisos, catalyst numbers 24 and 25 (Table 2) and commercially available catalysts from ElectroChem and EBTech were tested. The catalysts tested are listed in Table 3.

TABLE 3

Catalyst activity tests for catalysts under standard conditions.

| Catalyst No. | Amount (mg) | Pt source | wt % Pt loading | wt % Ru loading | Total loading | SSA $m^2/g$ |
|---|---|---|---|---|---|---|
| | catalyst used | | | | | |
| 24 | 50 | $H_2PtCl_6$ | 5 | 5 | 10 | 1000 |
| 25 | 50 | $PtCl_2$ | 5 | 5 | 10 | 1300 |
| Electro-Chem | 500 | ? | 20 | 10 | 30 | 200 |
| EBTech | 500 | ? | ? | ? | ? | NA |

Figure 6:
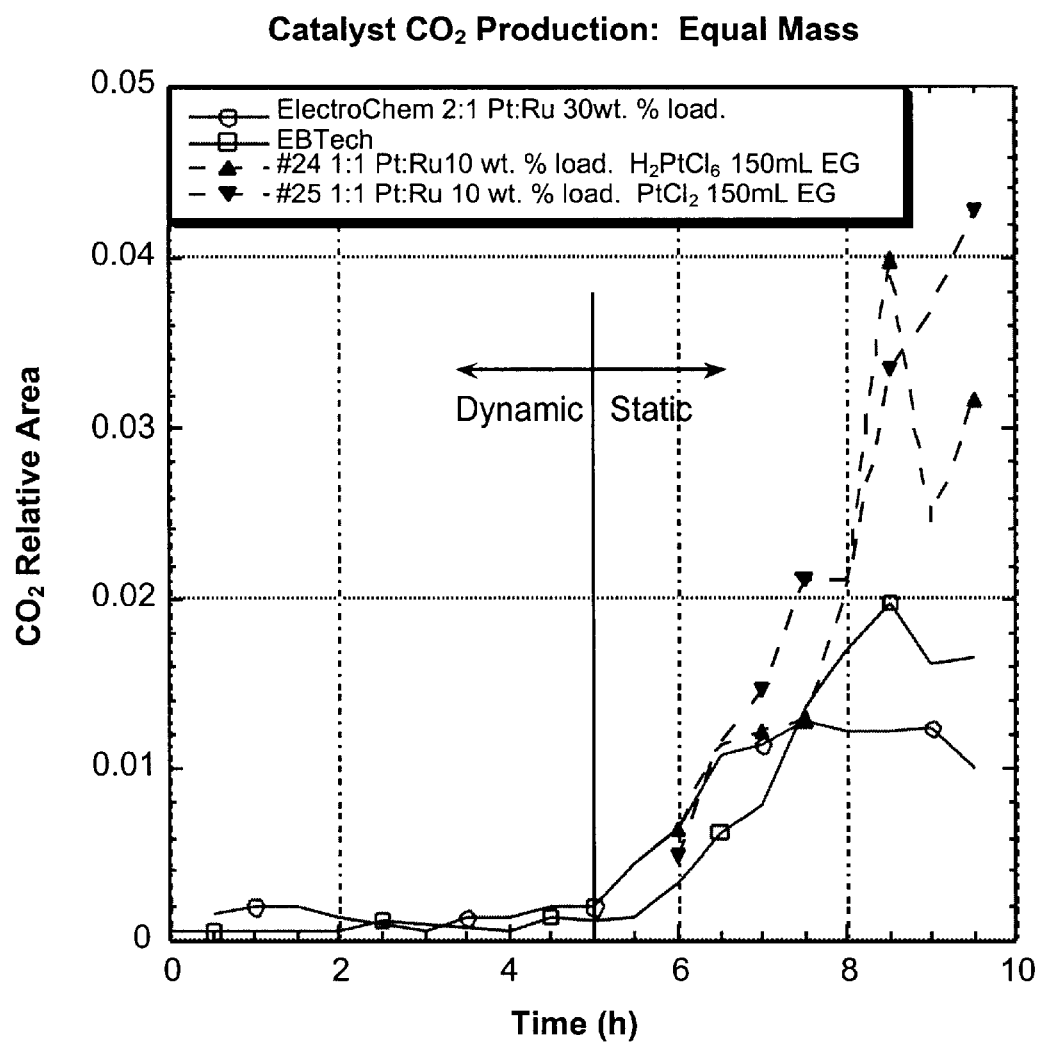
FIG. 6 is a graph of $CO_2$ production vs. time for four catalysts based upon an equal mass of catalyst and support.

The $CO_2$ data are likely to be the most reliable. FIG. 6 compares the $CO_2$ production rates for all of the catalysts at equal mass. This means that the data for the catalysts prepared according to the present invention have been multiplied by 10×. Hence, during dynamic flow, the rates of $CO_2$ production are too small to see. However, once the system goes static, $CO_2$ production is easily observed and comparable or slightly higher than the commercial catalyst data. This suggests that the synthesized catalysts within the scope of the present invention exhibit high activity.

Figure 7:
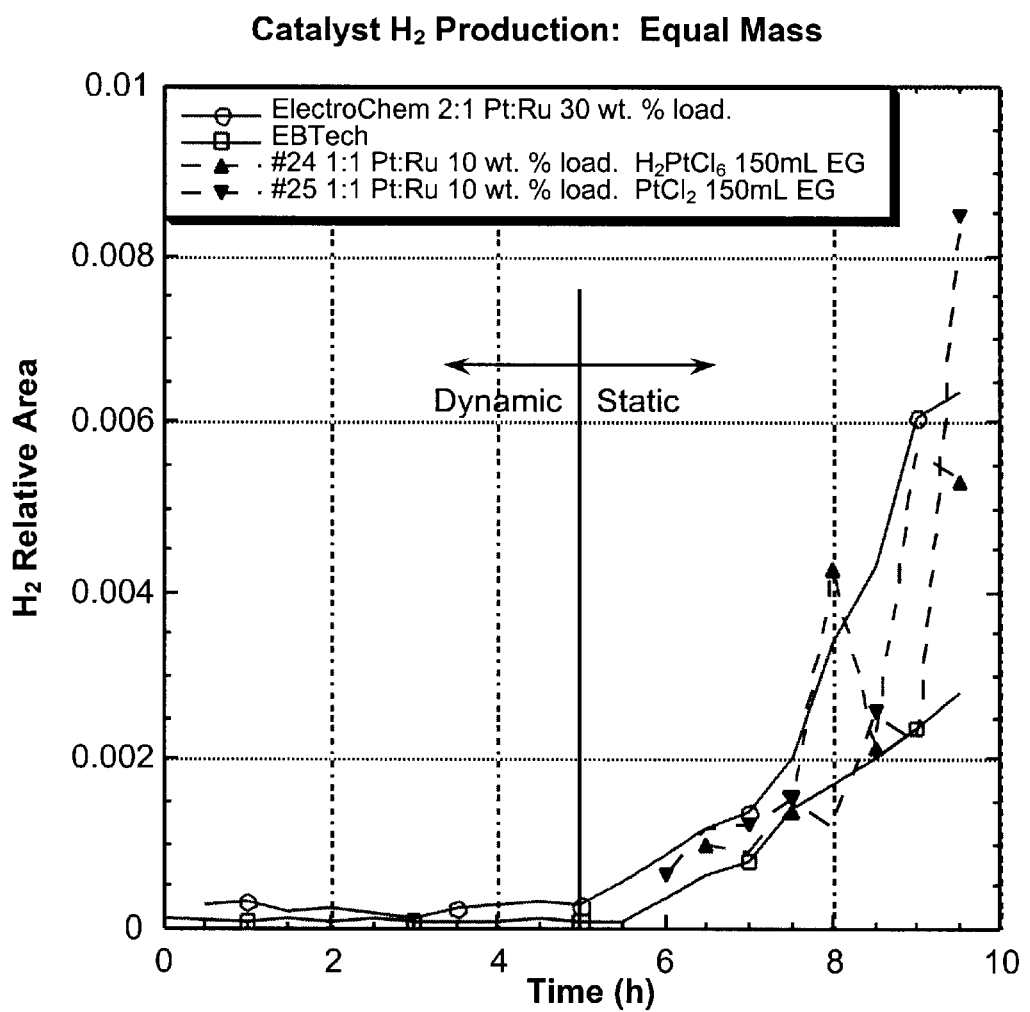
FIG. 7 is a graph of $H_2$ production vs. time for four catalysts based upon an equal mass of catalyst and support.

FIG. 7 shows the hydrogen production data on an equal mass of catalyst basis. The data indicate that on a mass basis, the catalysts within the scope of the present invention are at least comparable in activity to commercially available catalysts.

Figure 8:
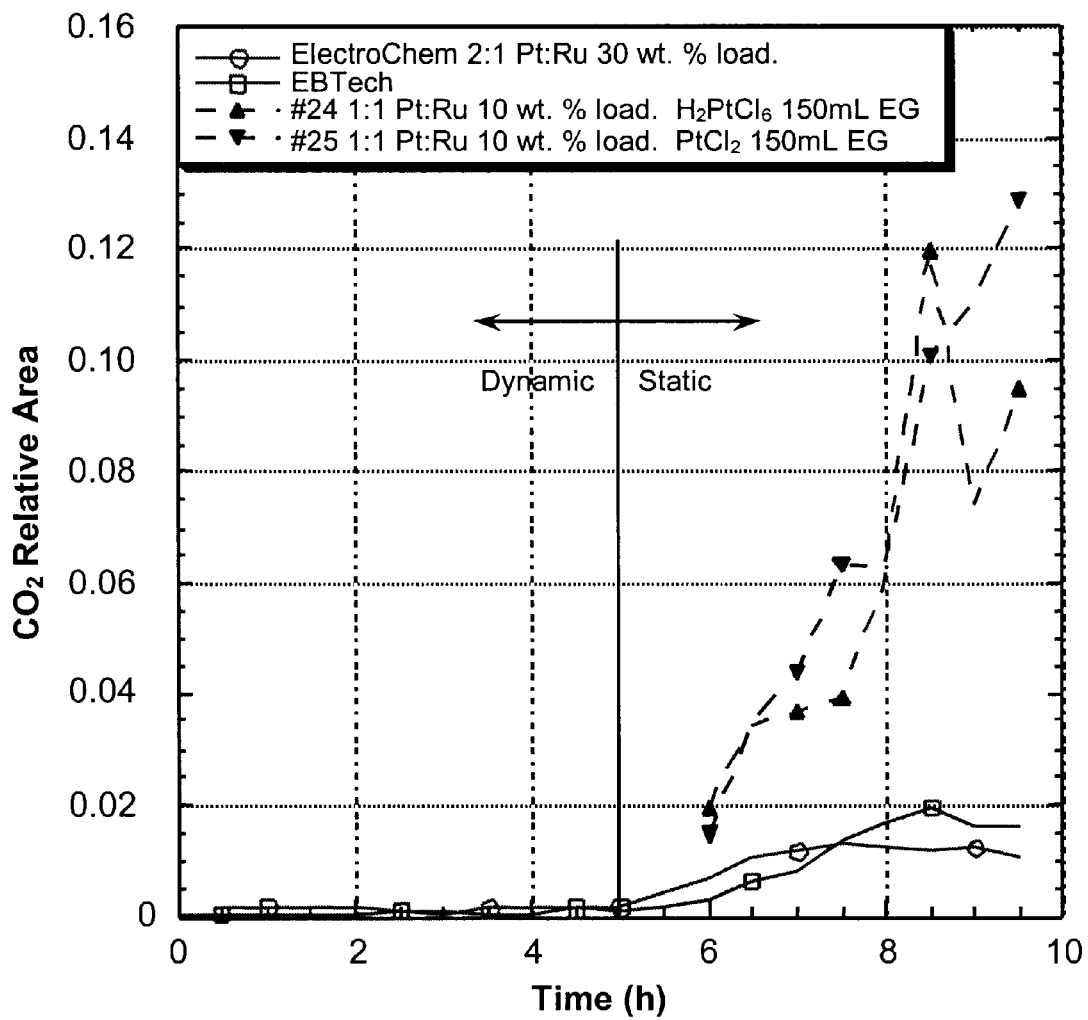
FIG. 8 is a graph of $CO_2$ production vs. time for four catalysts based upon equimolar amounts of metal.

An important observation of the foregoing results is the fact that the metals contents of the commercial catalysts and present invention catalysts are not the same. The Electro-Chem catalyst is 30 wt. % 2:1 Ru:Pt and the EBTech catalyst is believed to be the 30 wt. % 1:1 Ru:Pt. FIG. 8 reconciles the catalyst activities on a moles of metal basis. As shown in FIG. 8, the catalysts prepared according to the present invention are about 5× more active than the commercially available catalysts.

Additional mixed metal catalysts were prepared, substantially in accordance with the procedure of Example 2. These catalysts are summarized below in Table 4:

TABLE 4

Pt/Ru, Pt/Ru/Cu, and Pt/Ru/Co mixed metal catalysts impregnated coincidentally on activated carbon.

| Cat- alyst | $PtCl_2$ | $RuCl_3$ | Cu $(C_2H_3O_2)_2$ | $CoCl_2$ | C* | Rxn. Time |
|---|---|---|---|---|---|---|
| 201 | 0.135 g (100 mL) | 0.200 g (100 mL) | | | 1.000 g (800 mL) | 15 min. |
| 201a | 0.135 g (100 mL) | 0.200 g (100 mL) | | | 1.000 g (800 mL) | 15 min. |
| 202 | 0.270 g (100 mL) | 0.400 g (100 mL) | | | 2.000 g (800 mL) | 15 min. |
| 203 | 0.675 g (100 mL) | 1.000 g (100 mL) | | | 5.000 g (800 mL) | 15 min. |
| 203a | 0.675 g (100 mL) | 1.000 g (100 mL) | | | 5.000 g (800 mL) | 15 min. |
| 204 | 0.266 g (65 mL) | 0.207 g (65 mL) | 0.200 g (70 mL) | | 1.000 g (800 mL) | 15 min. |
| 205 | 0.266 g (65 mL) | 0.207 g (65 mL) | | 0.130 g (70 mL) | 1.000 g (800 mL) | 15 min. |
| 206 | 0.135 g (100 mL) | 0.200 g (100 mL) | | | 1.000 g (800 mL) | 15 min. |
| 207 | 0.135 g (100 mL) | 0.200 g (100 mL) | | | 1.000 g (800 mL) | 15 min. |
| 208 | 0.135 g (100 mL) | 0.200 g (100 mL) | | | 1.000 g (800 mL) | 15 min. |

Figure 9:
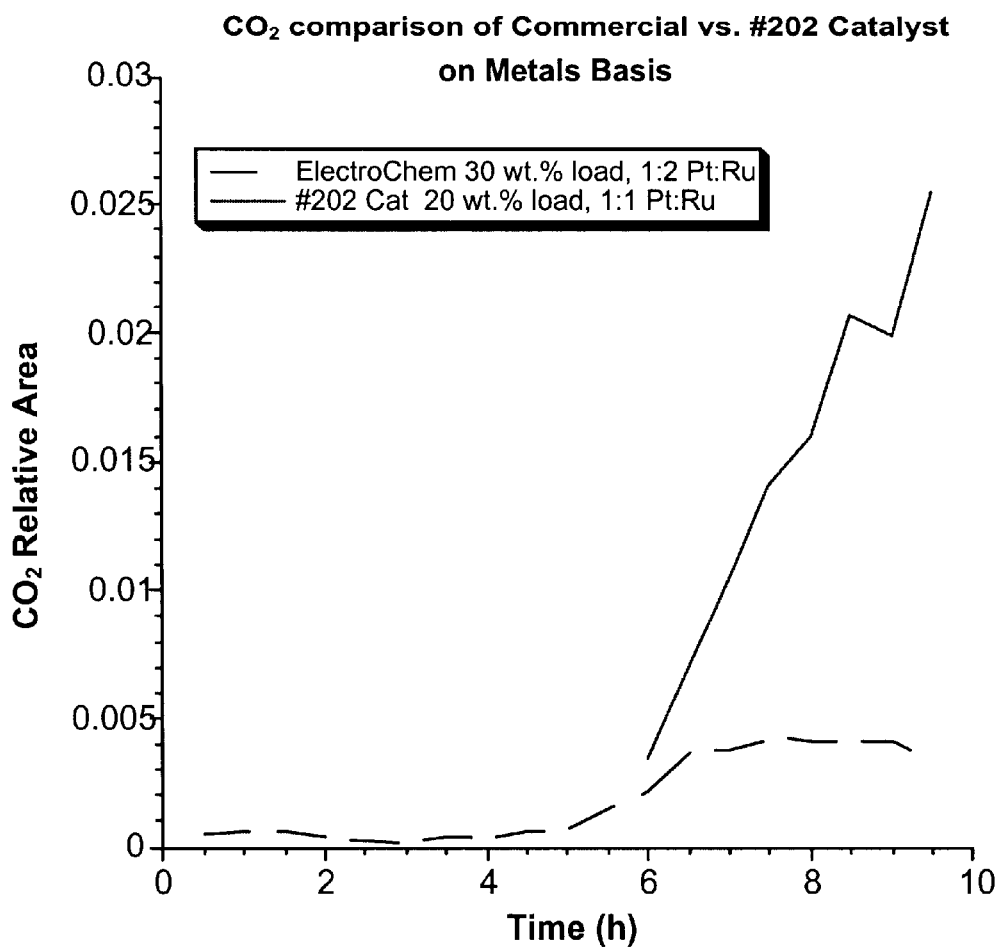
FIG. 9 is a graph of $CO_2$ production vs. time comparing a commercially available catalyst with a catalyst within the scope of the present invention based upon an equal mass of catalyst and support.
Figure 10:
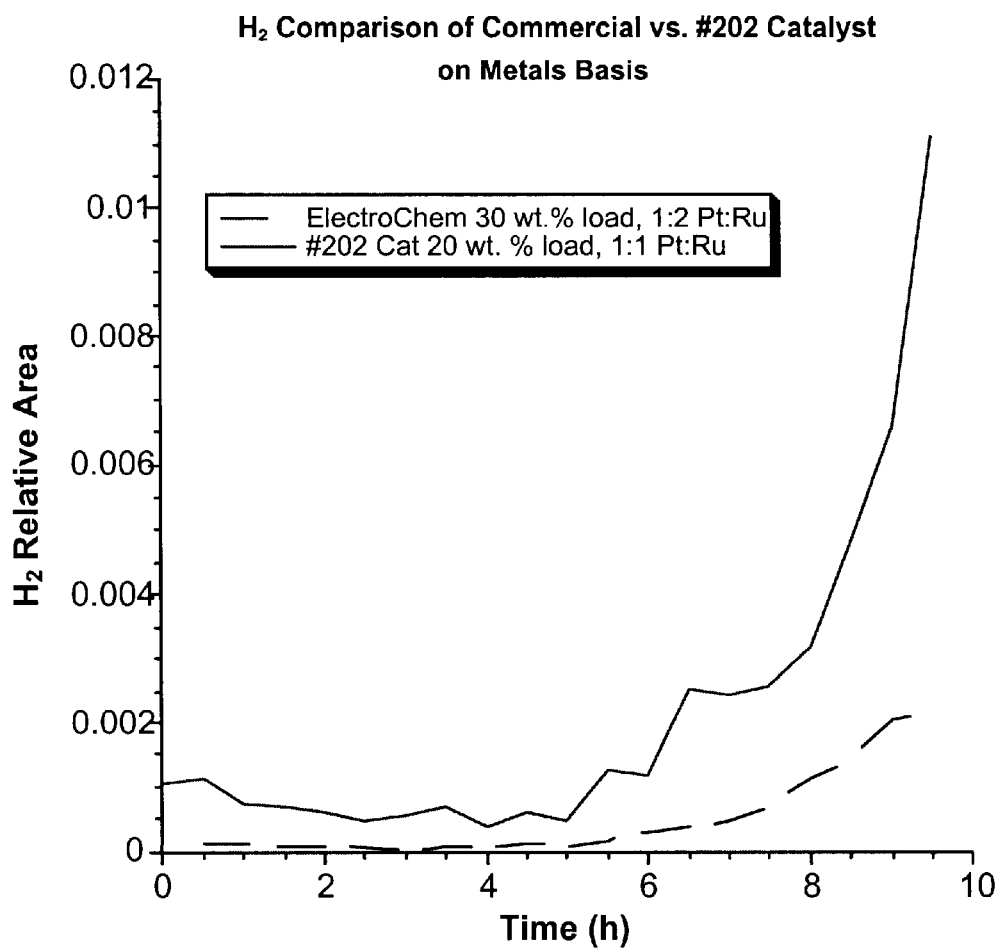
FIG. 10 is a graph of $H_2$ production vs. time comparing a commercially available catalyst with a catalyst within the scope of the present invention based upon an equal mass of catalyst and support.

*Catalyst 201 through 205 used carbon with a surface area of 1500 $m^2/g$
Catalyst 206 used Cabot Monarch 1300 carbon with a surface area of 560 $m^2/g$
Catalyst 207 used Cabot Vulcan XC72R carbon with a surface area of 254 $m^2/g$
Catalyst 208 used Cabot Monarch 1000 carbon with a surface area of 343 $m^2/g$ FIG. 9 compares the $CO_2$ production rates for the commercially available ElectroChem catalyst (30 wt. % 2:1 Ru:Pt) with catalyst #202 defined in Table 4 at equal mass. As described above, during dynamic flow, the rates of $CO_2$ production are too small to see. However, once the system goes static, $CO_2$ production is easily observed. Catalyst #202 exhibits high activity. FIG. 10 shows the hydrogen production data on an equal mass of catalyst basis for the two catalysts shown in FIG. 9. The data indicate that on a mass basis, catalyst #202 exhibits high activity.

Figure 11:
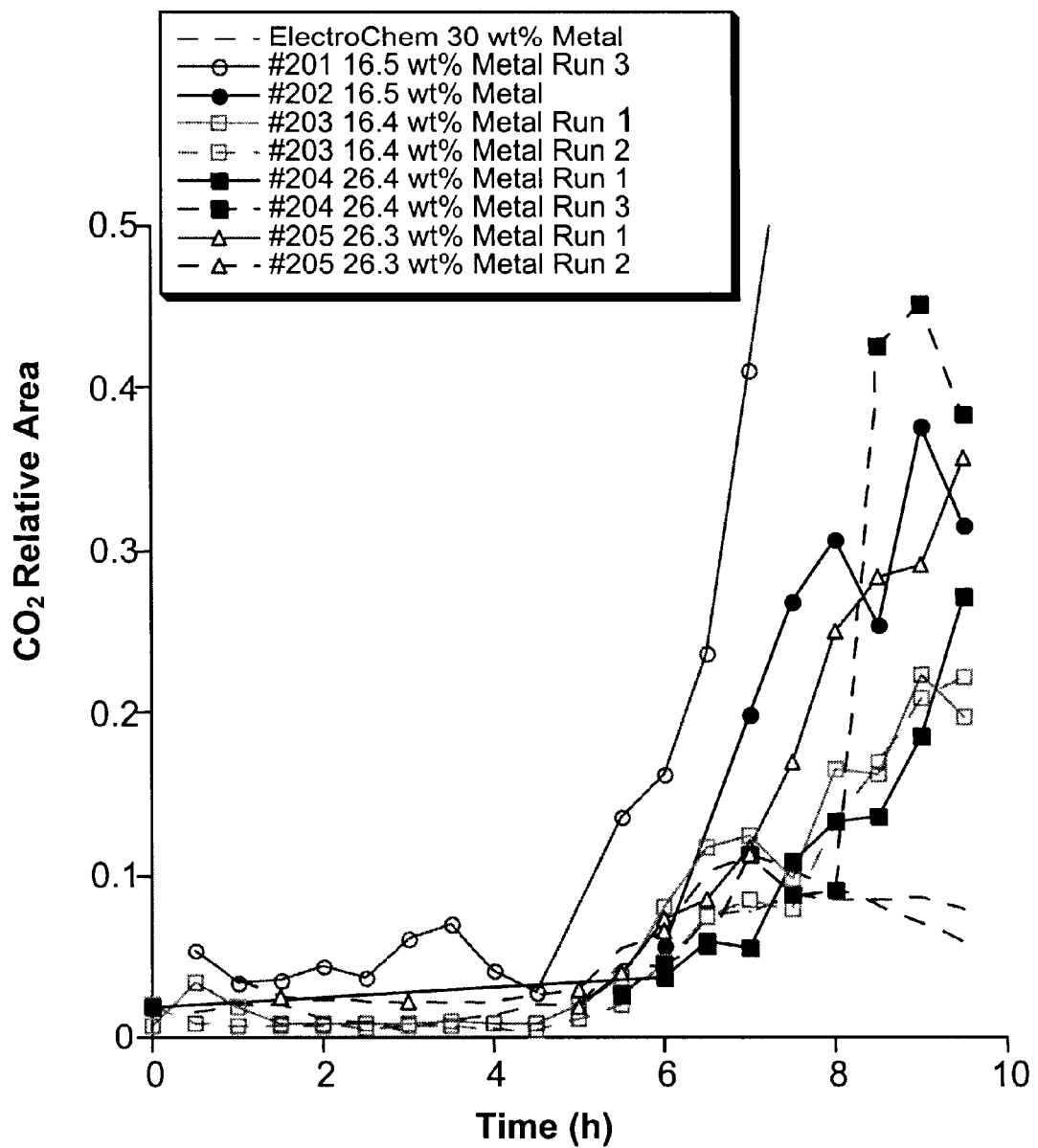
FIG. 11 is a graph of $CO_2$ production vs. time for several catalysts based upon an equal mass of catalyst and support.

FIG. 11 compares the $CO_2$ production rates for the commercially available ElectroChem catalyst (30 wt. % 2:1 Ru:Pt) with the catalysts defined in Table 4 at equal mass. During static operation $CO_2$ production is easily observed.

Figure 12:
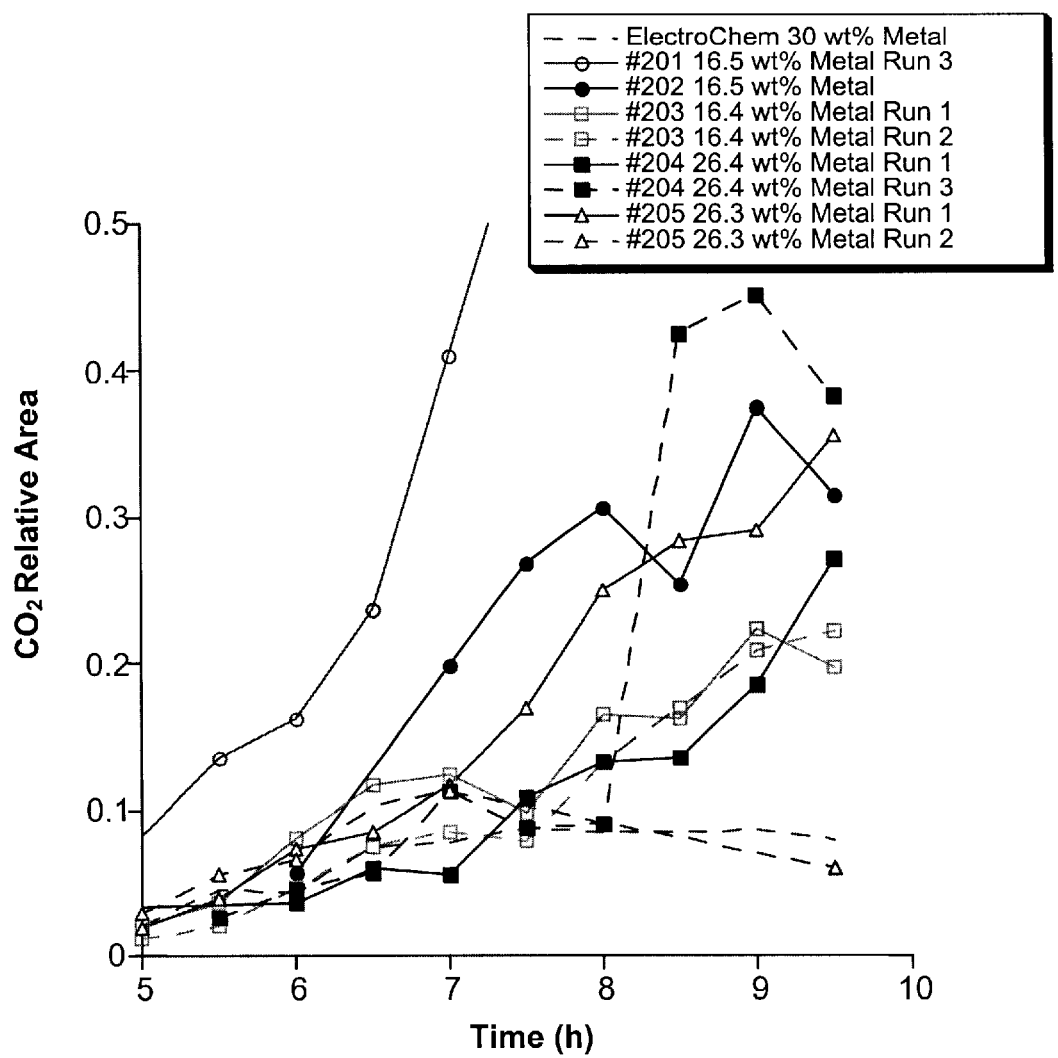
FIG. 12 is a graph of $CO_2$ production vs. time for the catalysts of FIG. 11 showing an expanded time scale.

The catalysts within the scope of the present invention exhibit high activity. FIG. 12 illustrates the static mode data of FIG. 11 with an expanded time scale.

From the foregoing, it will be appreciated that the present invention provides high activity, supported nano-sized mixed metal catalyst particles useful in methanol reforming reactions.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. A method of preparing a Pt/Ru catalyst comprising the steps:
   preparing a solution of soluble platinum and soluble ruthenium in a viscous polyhydroxylic alcohol solvent having a viscosity in the range from 1 to 1000 cp to create a viscous polyol solution wherein the viscous polyhydroxylic alcohol solvent is selected from the group consisting of ethylene glycol, glycerol, triethanolamine and trihydroxymethylaminomethane and wherein the molar ratio of Pt:Ru ranges from 0.001:1 to 1:0.001;
   mixing the viscous polyol solution with an electrically conductive support material; and
   heating the viscous polyol solution mixed with the electrically conductive support material to a temperature in the range from 20° C. to 300° C. to reduce the Pt and Ru to a zero valence state and form Pt/Ru catalyst particles having a particle size less than 1 μm on the electrically conductive support material.

2. A method of preparing a Pt/Ru catalyst according to claim 1, wherein the soluble platinum is selected from the group consisting of $PtCl_2$, $H_2PtCl_6$, $Pt_2(dba)_3$, Pt(dvs), $Pt(OAc)_2$ $Pt(acac)_2$, $Na_2PtCl_6$, $K_2PtCl_6$, platinum carbonate, platinum nitrate, platinum perchlorate, platinum amine complexes, and mixtures thereof.

3. A method of preparing a Pt/Ru catalyst according to claim 1, wherein the soluble ruthenium is selected from the group consisting of $RuCl_3 \cdot xH_2O$, $Ru(acac)_3$, $Ru_3(CO)_{12}$, $Ru(OAc)_3$, ruthenium nitrate, ruthenium perchlorate, ruthenium amine complexes, and mixtures thereof.

4. A method of preparing a Pt/Ru catalyst according to claim 1, wherein the mixture is heated for a period from 1 minute to 24 hours.

5. A method of preparing a Pt/Ru catalyst according to claim 1, wherein the mixture is heated for a period from 1 minute to 5 hours.

6. A method of preparing a Pt/Ru catalyst according to claim 1, wherein the mixture is heated for a period from 1 minute to 1 hour.

7. A method of preparing a Pt/Ru catalyst according to claim 1, wherein the mixture further comprises an additive selected from the group consisting of group 6, 7, and 8 metals.

8. A method of preparing a Pt/Ru catalyst according to claim 7, wherein the mixture is heated for a period sufficient to reduce soluble forms of the Pt and Ru metals and the additive.

9. A method of preparing a Pt/Ru catalyst according to claim 1, wherein the mixture is heated to a temperature in the range from 60° C. to 220° C.

10. A method of preparing a Pt/Ru catalyst according to claim 1, wherein the mixture is heated to a temperature in the range from 70° C. to 190° C.

11. A method of preparing a Pt/Ru catalyst according to claim 1, wherein the Pt/Ru particles are present on the support material at a catalyst loading in the range from 0.1 to 0.5 mg/cm$^2$.

12. A method of preparing a Pt/Ru catalyst according to claim 1, wherein the Pt/Ru catalyst particles have a particle size less than 0.1 μm.

13. A method of preparing a Pt/Ru catalyst according to claim 1, wherein the Pt/Ru catalyst particles have a particle size less than 0.05 μm.

14. A method of preparing a Pt/Ru catalyst according to claim 1, wherein the soluble platinum and ruthenium have concentrations in the viscous polyol sufficient to yield a metal loading on the support less than 100 wt. % metal to 100 wt. % support.

15. A method of preparing a Pt/Ru catalyst according to claim 1, wherein the soluble platinum and ruthenium have concentrations in the viscous polyol solution sufficient to yield a metal loading on the support less than 50 wt. % metal to 100 wt. % support.

16. A method of preparing a Pt/Ru catalyst according to claim 1, wherein the soluble platinum and ruthenium have concentrations in the viscous polyol solution sufficient to yield a metal loading on the support less than 20 wt. % metal to 100 wt. % support.

17. A method of preparing a Pt/Ru catalyst according to claim 1, wherein the support material has a surface area in the range from 20 to 2000 m$^2$/g.

18. A method of preparing a Pt/Ru catalyst according to claim 1, wherein the support material has a surface area in the range from 200 to 1500 m$^2$/g.

19. A method of preparing a Pt/Ru catalyst according to claim 1, wherein the support material has a surface area in the range from 300 to 1500 m$^2$/g.

20. A method of preparing a Pt/Ru catalyst according to claim 1, wherein the support material is selected from the group consisting of metals, metal oxides and carbon.

21. A method of preparing a Pt/Ru catalyst according to claim 1, wherein the support material is selected from the group consisting of indium tin oxide, silver, gold, Pt/Ag alloys, copper, and indium zinc oxides.

22. A method of preparing a Pt/Ru catalyst according to claim 1, wherein the support material is a high surface area conductive material.

23. A method of preparing a Pt/Ru catalyst according to claim 1, wherein the support material is a conductive carbon material having pores sufficiently small to capture nanoparticles, but not too small to interfere with gas flow.

24. A method of preparing a Pt/Ru catalyst according to claim 1, wherein the support material is a conductive carbon material having a pore size between 1 nm and 100 nm.

25. A method of preparing a Pt/Ru catalyst according to claim 1, wherein the support material is a conductive carbon material having a pore size between 1 nm and 30 nm.

26. A method of preparing a Pt/Ru catalyst according to claim 1, wherein the support material is a conductive carbon material having a pore size between 1 nm and 10 nm.

27. A method of preparing a Pt/Ru catalyst according to claim 1, wherein the viscous polyhydroxylic alcohol is ethylene glycol.

28. A method of preparing a Pt/Ru catalyst according to claim 1, wherein the ratio of Ru:Pt ranges from 0.1:1 to 1:0.1.

29. A method of preparing a Pt/Ru catalyst according to claim 1, wherein the ratio of Ru:Pt ranges from 0.5:1 to 1:0.5.

30. A method of preparing a Pt/Ru catalyst according to claim 1, wherein the Pt/Ru catalyst is used in a fuel cell.

* * * * *

UNITED STATES PATENT AND TRADEMARK OFFICE
CERTIFICATE OF CORRECTION

PATENT NO. : 6,551,960 B1  Page 1 of 1
DATED : April 22, 2003
INVENTOR(S) : Richard M. Laine et al.

It is certified that error appears in the above-identified patent and that said Letters Patent is hereby corrected as shown below:

Column 11,
Line 5, "volume 100 ≈ µl" should read -- volume ≈ 100 µl --.

Signed and Sealed this

Second Day of December, 2003

JAMES E. ROGAN
*Director of the United States Patent and Trademark Office*